(12) United States Patent
Paver et al.

(10) Patent No.: US 7,245,945 B2
(45) Date of Patent: Jul. 17, 2007

(54) PORTABLE COMPUTING DEVICE ADAPTED TO UPDATE DISPLAY INFORMATION WHILE IN A LOW POWER MODE

(75) Inventors: Nigel C. Paver, Austin, TX (US); Mark Fullerton, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 527 days.

(21) Appl. No.: 10/289,081

(22) Filed: Nov. 5, 2002

(65) Prior Publication Data

US 2004/0087351 A1 May 6, 2004

(51) Int. Cl.
*H04B 1/38* (2006.01)
*G01R 31/08* (2006.01)

(52) U.S. Cl. ...................... 455/574; 370/216

(58) Field of Classification Search ............... 455/574, 455/566, 552.1, 415, 556.1, 572; 710/13; 370/329, 278, 342; 713/300, 322; 717/146; 345/539
See application file for complete search history.

(56) References Cited

U.S. PATENT DOCUMENTS

| | | | | |
|---|---|---|---|---|
| 5,084,869 A | * | 1/1992 | Russell | 370/329 |
| 5,347,634 A | * | 9/1994 | Herrell et al. | 345/539 |
| 5,706,478 A | * | 1/1998 | Dye | 345/503 |
| 5,903,852 A | * | 5/1999 | Schaupp et al. | 455/564 |
| 5,996,028 A | * | 11/1999 | Niimi et al. | 710/13 |
| 6,141,570 A | * | 10/2000 | O'Neill et al. | 455/574 |
| 6,178,338 B1 | * | 1/2001 | Yamagishi et al. | 455/566 |
| 6,278,703 B1 | * | 8/2001 | Neufeld | 370/342 |
| 6,289,464 B1 | * | 9/2001 | Wecker et al. | 713/300 |
| 6,442,407 B1 | * | 8/2002 | Bauer et al. | 455/574 |
| 6,538,449 B2 | * | 3/2003 | Juncker et al. | 324/429 |
| 6,547,620 B1 | * | 4/2003 | Hatamura et al. | 455/415 |
| 6,684,083 B1 | * | 1/2004 | Harimoto | 455/556.1 |
| 6,690,655 B1 | * | 2/2004 | Miner et al. | 370/278 |
| 2001/0029193 A1 | * | 10/2001 | Ishigaki | 455/566 |
| 2002/0004413 A1 | * | 1/2002 | Inoue | 455/566 |
| 2003/0023958 A1 | * | 1/2003 | Patel et al. | 717/146 |
| 2003/0073457 A1 | * | 4/2003 | Wang et al. | 455/552 |
| 2003/0115494 A1 | * | 6/2003 | Cervantes | 713/322 |
| 2004/0204172 A1 | * | 10/2004 | Herle | 455/572 |

* cited by examiner

*Primary Examiner*—William Trost
*Assistant Examiner*—Kiet Doan
(74) *Attorney, Agent, or Firm*—Stuart A. Whittington

(57) ABSTRACT

Briefly, in accordance with one embodiment of the invention, a portable computing device that has a processor, a direct memory access (DMA) engine, and a display controller may transfer data with the DMA engine to the display. The DMA engine may transfer the data while the processor is in a standby mode and transfer data to the processor while the processor is executing instructions.

20 Claims, 2 Drawing Sheets

PORTABLE COMPUTING DEVICE ADAPTED TO UPDATE DISPLAY INFORMATION WHILE IN A LOW POWER MODE

BACKGROUND

Portable computing devices such as, for example, cellular phones, typically operate on battery power. The amount of time that a portable computing device may be operated using a battery is typically directly proportional to the amount of power consumed by electronic devices within the portable computing device. Accordingly, it may be desirable to turn off or suspend operation of components (e.g. the processor) while the device is not in use. However, it may also be desirable to continue to display information on the display while the portable computing device is not in use.

Thus, there is a continuing need for better ways to display information while reducing the effect on battery life.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
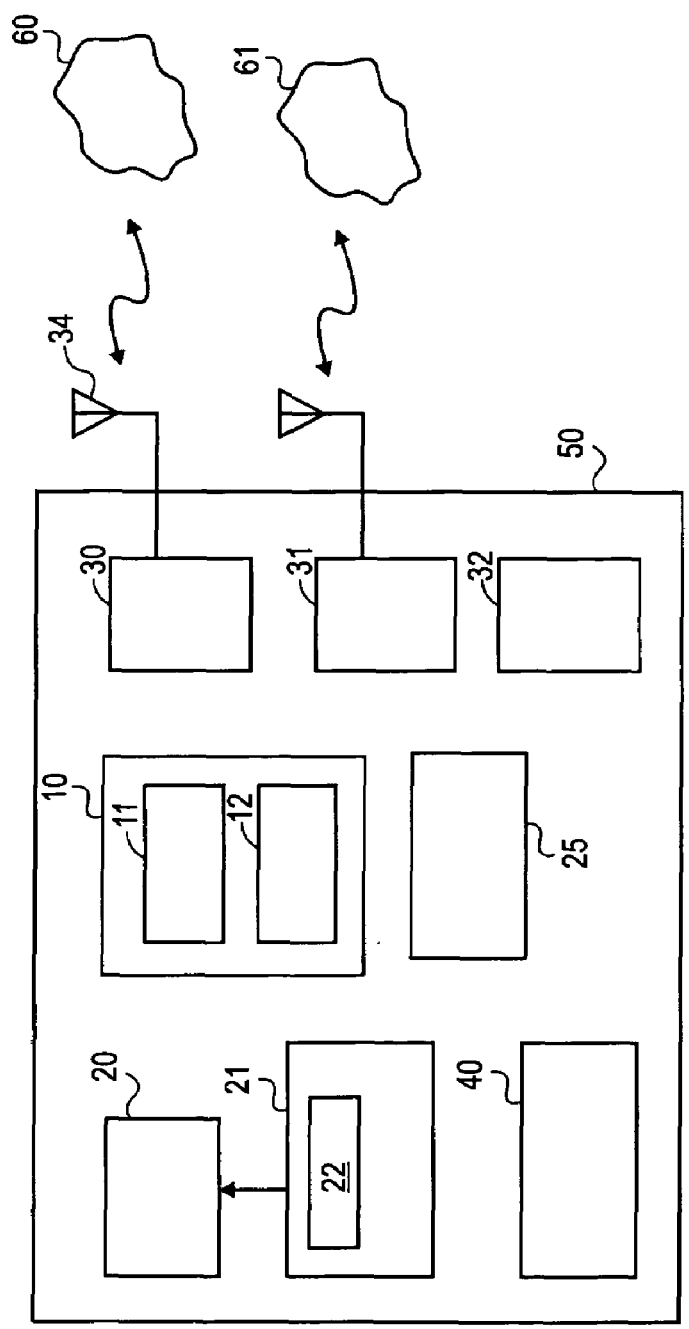
FIG. 1 is a block diagram representation of a mobile device in accordance with an embodiment of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CDROMs), magnetic-optical disks, read-only memories (ROMs), random access memories (RAMs), electrically programmable read-only memories (EPROMs), electrically erasable and programmable read only memories (EEPROMs), flash memories, digital video disk ROM, magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Turning to FIG. 1, an embodiment 100 in accordance with the present invention is described. Embodiment 100 may comprise a portable computing or communication device 50 such as a mobile communication device (e.g., cell phone), a two-way radio communication system, a one-way pager, a two-way pager, a personal communication system (PCS), a portable computer, or the like. Although it should be understood that the scope and application of the present invention is in no way limited to these examples. Other embodiments of the present invention may include other computing systems that may or may not be portable or even involve communication systems such as, for example, desktop or portable computers, servers, personal digital assistants (PDAs), network switching equipment, etc.

In this particular embodiment portable communication device 50 may include a processor 10 that may execute instructions such as instructions stored in a memory 40. Processor 10 may be one of a variety of integrated circuits such as, for example, a microprocessor, a central processing unit (CPU), a digital signal processor, a microcontroller, a reduced instruction set computer (RISC), a complex instruction set computer (CISC), or the like, although the scope of the present invention is not limited by the particular design or functionality performed by processor 10. In addition, in some alternative embodiments, portable communication device 50 may comprise multiple processors that may be of the same or different type. For example, in another embodiment, portable communication device 50 may comprise a CISC processor to execute general user applications and a base band processor that may be used to initiate and receive wireless communications.

Portable communication device 50 may also comprise a display 20 to provide information to a user (i.e. time of day, remaining battery strength, strength of transmitting and/or received signals, etc.). A display controller 21 having a frame buffer 22 may be used to store and provide information to be displayed, although the scope of the present invention is not limited in this respect.

Portable communication device 50 may further comprise communication modules 30–32 to provide access to other devices, service, networks, etc. For example communication modules 30–32 may be used to allow portable communication device 50 to communicate with other devices networks through either a wired or wireless link. As shown, communication modules may use antennae 34–35 to wirelessly communicate with networks 60–61.

Although the scope of the present invention is not limited in this respect, communication modules 30–31 may employ a variety of wireless communication protocols such as cellular (e.g. Code Division Multiple Access (CDMA) cellular radiotelephone communication systems, Global System for Mobile Communications (GSM) cellular radiotelephone systems, GPRS, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, and the like).

In addition, communication modules may use other wireless local area network (WLAN), wide area network (WAN), or local area network (LAN) protocols such as the Industrial Electrical and Electronics Engineers (IEEE) 802.11 standard, Bluetooth™, infrared, etc. (Bluetooth is a registered trademark of the Bluetooth Special Interest Group).

It should be understood that the scope of the present invention is not limited by the types of, the number of, or the frequency of the of communication protocols that may be used by portable communication device 50. Furthermore, alternative embodiments may only have no, one, or two communication modules (either wired or wireless) and communication modules need not have separate antenna, and some or all may share a common antenna.

Portable communication device 50 may also comprise memory 40 that may comprise any variety of volatile or non-volatile memory such as any of the types of storage media recited earlier, although this list is certainly not meant to be exhaustive and the scope of the present invention is not limited in this respect. Memory 40 may be used to store sets of instructions such as instructions associated with an application program, an operating system program, a communication protocol program, etc. For example, the instructions stored in memory 40 may be used to perform wireless communications, provide security functionality for portable communication device 50, user functionality such as calendaring, email, internet browsing, etc. Further, as explained in more detail below, memory 40 may be used to store information to be displayed by display 20. In addition to or alternatively, processor 10 may comprise embedded memory 11 that may be used in a manner similar to memory 40 and comprise any of the memory types described above or other memory compatible with processor 10.

Portable computing device 50 may also comprise a direct memory access (DMA) engine 25 that may be used to transfer information to be displayed by display 20, although the scope of the present invention is not limited in this respect. In addition, DMA engine 25 may also be used to transfer data to and from other components of portable communication device 50. For example, DMA engine 25 may also be optionally be used to transfer data and/or instructions from memory 40 to processor 10 while processor 10 is executing instructions.

Although the scope of the present invention is not limited in this respect, the operation of DMA engine 25 may involve the use of instructions or descriptors. For example, the descriptors may include information such as where the information is originating from, the destination of the data, the type of data being transferred, the size of the data being transferred, addressing information (e.g. address offset information, etc.) that may be used during the accessing of the source and/or destination of the data, etc. It should be understood that the scope of the present invention is not limited so as to require all or any particular subset of the information listed above. In addition, other information may be included with the descriptors used by DMA engine 25.

Figure 2:
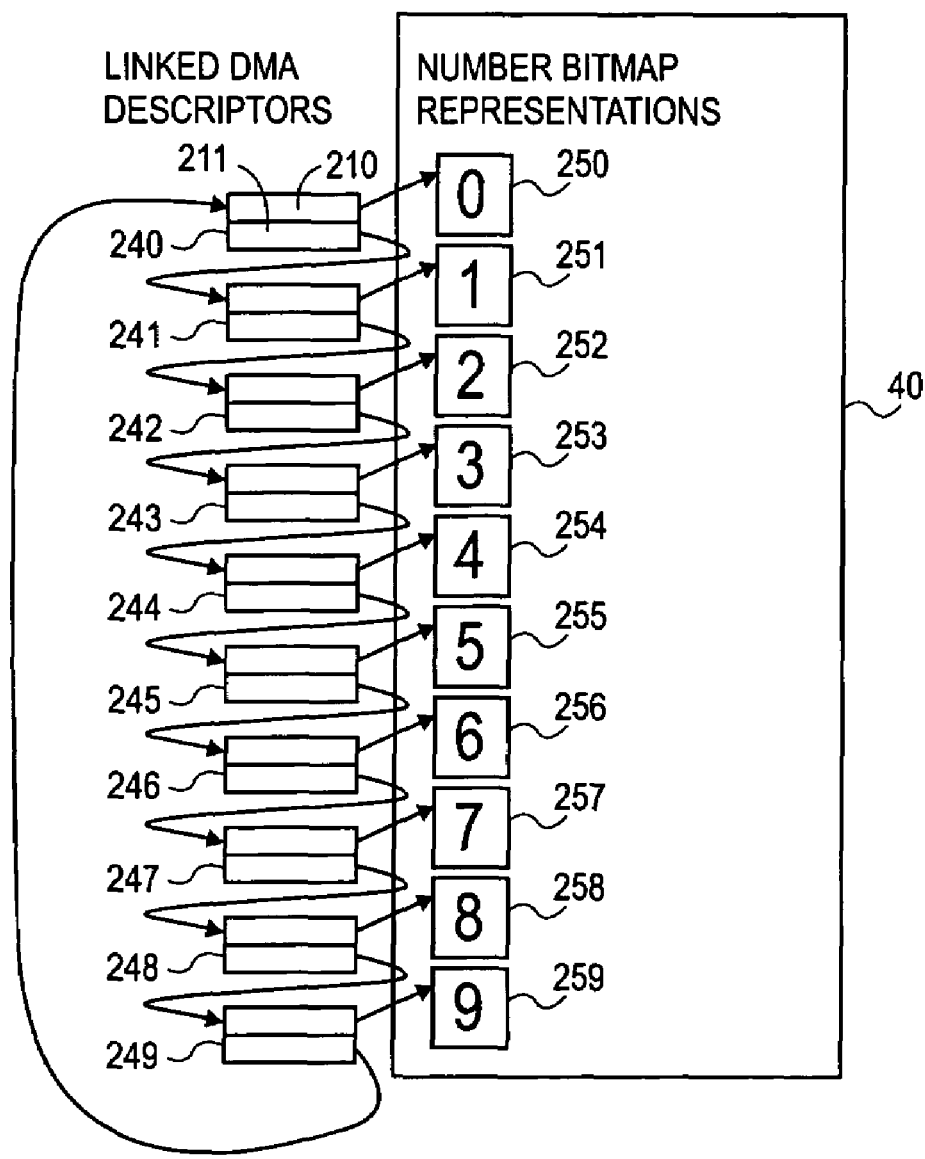
FIG. 2 is a descriptor to bitmap representation for a method of operating the mobile device in FIG. 1 according to one embodiment of the present invention.

Turning to FIG. 2, a method in accordance with a particular embodiment is now provided. In this particular embodiment DMA engine 25 may be used to transfer data to be displayed on display 20 without involving processor 10 as explained in more detail below. Although the scope of the present invention is not limited in this respect, processor 10 may have two or more operational modes such as, for example, a normal operational mode during which instructions are executed and a standby or low power mode during which the execution of instructions is either significantly reduced (i.e. clock frequency is reduced) or halted altogether, or alternatively, reduce or remove the power supply potentials from the device.

Processor 10 may have a core or core region 12 that may be used to execute instructions. Core 12 may include, for example, logic circuitry to execute instructions, buses, caches, arithmetic logic units (ALUs), registers, etc. In addition, core 12 may or may not include memory such as memory 11. It should be understood that the scope of the invention is not limited so as to require that core 12 include all of these elements as in alternative embodiments other components may be included within core 12 or the elements listed above may not be in core 12 or even within processor 12. Simply stated, for this particular embodiment, core 12 refers to a portion of processor 10 that may be inactive while DMA engine 25 is transferring data to be displayed.

It should be understood that processor 10 may also have two or more standby modes during which the execution of instructions is either reduced or halted. For example, one standby mode may represent a condition where only a portion of processor 10 is active and executing instructions, another standby mode may represent a condition during with the power supply voltage potential and/or clock frequency of core 12 is reduced to reduce power consumption. In addition, yet another standby mode may represent a condition where the power supply voltage potential is removed altogether from all or a portion of processor 10. In yet another embodiment, processor 10 may have a standby or disabled operational mode where at least a portion of the logic circuitry of core region 12 is indeterminate.

Thus, while processor is in a standby or inactive mode, DMA engine 25 may transfer data to be displayed. For example, in the embodiment shown in FIG. 2, DMA engine 25 may be used to transfer data so that display 20 may continue to display information such as the current time without involving processor 10. In this example, memory 40 may store information associated with the bit maps 250–259 to display the digits zero to nine, respectively. Descriptors 240–249 may provide a linked list so that DMA engine 25 transfers the appropriate bitmap to display 20.

In this particular example, descriptors 240–249 may include one portion 210 that comprises the location of the bitmap to be transferred to frame buffer 22 of display controller 21. For example, portion 211 may include the start address of the location in memory 40 for the bitmap of a particular numeral. In addition, descriptions 240–249 may include a portion 211 that may indicate the next descriptor to be executed or performed by DMA engine 25 upon the occurrence of an event or trigger.

For example, DMA engine 25 may execute descriptor 240 to transfer the data associated with the bit map for the numeral 0 from memory 40 to frame buffer 22, display controller 21 may then have the bit map displayed on the appropriate location of display 20. DMA engine 25 may then wait for the occurrence of an event or a trigger before performing the transfer associated with descriptor 241. Although the scope of the present invention is not limited in this respect, DMA engine 25 may wait for an enable or logic signal from circuitry indicating the appropriate moment to display the information associated with descriptor 241.

The enable or logic signal may come from a variety or sources such as, but not limited to, an interrupt signal, a transition in a clock or logic signal, output of a timer, a logic circuit, etc. It should be understood that the scope of the present invention is not limited by the nature or source of the trigger signal that causes DMA engine to transition to the next descriptor. In this particular example, the event signal may come from an internal clock that notifies DMA engine to display the next numeral. As shown in FIG. 2, DMA engine 25 may then cycle through descriptors 240–249 with each event trigger, and thus, display the numerals zero-through nine, and then repeat as the last descriptor 249 may point back to descriptor 240 to repeat the process, although the scope of the present invention is not limited in this respect.

In alternative embodiments DMA engine 25 may be used to transfer different data to be displayed on display 25. Thus, DMA engine 25 may modify the image or data that is to be displayed by transferring data to the display controller. For example, DMA engine 25 may transfer information as current date, received signal strength, transmitted signal strength, battery life, and others. Alternatively or in addition to, DMA engine 25 may display bit maps that when displayed in sequence allow display 20 to display images such as, for example, moving icons, video images, etc. The bit map may also be used to provide other information to a user such as the fact that there are messages waiting, no service is available, etc. However, it should be understood that the scope of the present invention is not limited by the particular information transferred by DMA engine 25.

One advantage of this particular embodiment, although not necessarily all embodiments, is that image data may be transferred to display controller 21 without involving the use of a core region 12 of processor 10. As a result, the transfers may be done without the associated power consumption of processor 10 since processor 10 may be kept in a standby or disabled operational mode. In other words, the transfer to display controller 21 may be done without having to change the operational mode of processor 10, although the scope of the present invention is not limited in this respect.

It should also be understood that the use of DMA engine 25 need not be limited to transferring data while processor 10 is in active. DMA engine 25 may also be used to transfer data (e.g. instructions, operations, etc.) to processor 10 while processor 10 is in a normal operational mode or is otherwise executing instructions. Similarly, DMA engine 25 may be used to transfer other data (e.g. voice data, user data, instructions, etc.) between other components of portable computing device 50; some of which may not be shown in FIG. 1.

In yet another embodiment, DMA engine 25 may be used to transfer data to display controller 21 from memory that is internal to processor 10. In other words, the source of the data to be display need not be external to processor 10.

In the case where portable computing device 50 is a cellular phone, DMA engine 15 may be used to display or update information on display 20 without involving the use of processor 10. For example, in some embodiments portable computing device 50 may comprise more than one processor such as, for example, a base band processor that may be used to hand wireless communications and an application processor to execute user applications. In such applications, DMA engine 25 may used to display information associated with the base band processor (e.g. received signal strength) without involving the applications processor. In such embodiments, a base station may transmit signals to portable computing device 50, and the appropriate images may be displayed on display 20 without involving the application processor or its associated power consumption.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

What is claimed is:

1. A wireless communication device comprising:
    a processor having a core region, wherein the processor has at least an operational mode and a standby operational mode;
    a direct memory access (DMA) engine; and
    a display coupled to the processor, and DMA engine, wherein the wireless communication device is adapted to modify data to be displayed on the display while at least a portion of the core region of the processor is in the standby operational mode, and wherein the DMA engine is adapted to transfer information from a memory to the display while at least a portion of the core region of the processor is in the standby operational mode.

2. The wireless communication device of claim 1, wherein the memory is external to the processor.

3. The wireless communication device of claim 2, wherein the memory is within the processor.

4. The wireless communication device of claim 1, wherein the DMA engine is adapted to transfer information from the memory to a frame buffer in a display controller.

5. The wireless communication device of claim 1, wherein the DMA engine is further adapted to transfer data from a data source to the core of the processor while the processor is in the operational mode.

6. The wireless communication device of claim 5, wherein the data source is an external memory that is external to the processor.

7. The wireless communication device of claim 1, wherein the processor is adapted to halt the execution of instructions while in the standby operational mode.

8. The wireless communication device of claim 1, wherein the data to be displayed is indicative of information selected from the group comprising of current time, received signal strength, transmitted signal strength, and battery life.

9. An apparatus comprising:
a processor, the processor having at least a first operational mode and a second operational mode;
a display controller; and
a direct memory access (DMA) engine to transfer data to the display controller while the processor is in second operational mode, wherein the DMA engine if further adapted to transfer data from a memory to the processor while the processor is in the first operational mode.

10. The apparatus of claim 9, wherein the processor includes a core region and at least a portion of the core region is in an inactive state when the processor in the second operational mode.

11. The apparatus of claim 9, wherein the processor includes a core region and at least a portion of the core region is in an indeterminate logic state when the processor in the second operational mode.

12. The apparatus of claim 9, wherein the processor includes a core region and at least a portion of the core region is provided with a power supply voltage potential when the processor in the second operational mode than when the processor is in the first operational mode.

13. The apparatus of claim 9, wherein the processor does not execute instructions when the processor in the second operational mode.

14. The apparatus of claim 9, where in the memory is external to the processor.

15. A method of displaying information on a display of a portable computing device, comprising:
transferring information from a memory to a display controller with a direct memory access (DMA) engine while a processor in the portable computing device is in a disabled operational mode.

16. The method of claim 15, wherein transferring information includes transferring information upon detection of an event.

17. The method of claim 15, further comprising transferring information to the processor with the DMA engine when the processor is in an enabled operational mode.

18. The method of claim 15, wherein transferring information includes transferring information while the processor has halted the execution of instructions.

19. A method of operating a communication network having a base station and at least one mobile station, the method comprising:
transmitting a signal from the base station to the at least one mobile station so that a processor in the at least one mobile station transitions from a first operational mode to a second operational mode, wherein the processor suspends the execution of instructions and a direct memory access (DMA) engine transfers data from a memory to a display controller while the processor is in the second operation mode.

20. The method of claim 19, further comprising transmitting another signal from the base station to the at least one mobile station so that the processor transitions to the first operation al mode, wherein the DMA engine transfers data to the processor while the processor is in the first operational mode.

* * * * *

UNITED STATES PATENT AND TRADEMARK OFFICE
CERTIFICATE OF CORRECTION

PATENT NO. : 7,245,945 B2
APPLICATION NO. : 10/289081
DATED : July 17, 2007
INVENTOR(S) : Paver et al.

Page 1 of 1

It is certified that error appears in the above-identified patent and that said Letters Patent is hereby corrected as shown below:

In column 6, line 57, in Claim 1, after "processor" delete ",".

In column 7, line 31, in Claim 10, after "processor" insert -- is --.

In column 7, line 35, in Claim 11, after "processor" insert -- is --.

In column 7, line 40, in Claim 12, after "processor" insert -- is --.

In column 8, line 2, in Claim 13, after "processor" insert -- is --.

In column 8, line 4, in Claim 14, delete "where in" and insert -- wherein --, therefor.

In column 8, line 37, in Claim 20, delete "operation al" and insert -- operational --, therefor.

Signed and Sealed this

Twenty-seventh Day of May, 2008

JON W. DUDAS
*Director of the United States Patent and Trademark Office*

UNITED STATES PATENT AND TRADEMARK OFFICE
CERTIFICATE OF CORRECTION

PATENT NO. : 7,245,945 B2
APPLICATION NO. : 10/289081
DATED : July 17, 2007
INVENTOR(S) : Paver et al.

It is certified that error appears in the above-identified patent and that said Letters Patent is hereby corrected as shown below:

In column 6, line 57, in Claim 1, after "processor" delete ",".

In column 7, line 31, in Claim 10, after "processor" insert -- is --.

In column 7, line 35, in Claim 11, after "processor" insert -- is --.

In column 7, line 40, in Claim 12, after "processor" insert -- is --.

In column 8, line 2, in Claim 13, after "processor" insert -- is --.

In column 8, line 4, in Claim 14, delete "where in" and insert -- wherein --, therefor.

In column 8, line 37, in Claim 20, delete "operation al" and insert -- operational --, therefor.

Signed and Sealed this

Nineteenth Day of August, 2008

JON W. DUDAS
*Director of the United States Patent and Trademark Office*